US012608400B2

(12) United States Patent
Pawaskar et al.

(10) Patent No.: US 12,608,400 B2
(45) Date of Patent: Apr. 21, 2026

(54) TABLEWARE UTILIZATION TRACKING SYSTEM

(71) Applicant: Toshiba Global Commerce Solutions, Inc., Durham, NC (US)

(72) Inventors: Sagar Mangesh Pawaskar, Morrisville, NC (US); Phillip Monkowski, Apex, NC (US); Srijana Shrestha, Cary, NC (US); Donna Roberts, Springdale, AR (US)

(73) Assignee: Toshiba Global Commerce Solutions, Inc., Durham, NC (US)

( * ) Notice: Subject to any disclaimer, the term of this patent is extended or adjusted under 35 U.S.C. 154(b) by 0 days.

(21) Appl. No.: 18/205,377

(22) Filed: Jun. 2, 2023

(65) Prior Publication Data

US 2024/0403317 A1    Dec. 5, 2024

(51) Int. Cl.
*G06F 16/27* (2019.01)

(52) U.S. Cl.
CPC .................................. *G06F 16/27* (2019.01)

(58) Field of Classification Search
CPC ...................................................... G06F 16/27
See application file for complete search history.

(56) References Cited

U.S. PATENT DOCUMENTS

| 2004/0124988 A1 | 7/2004 | Leonard et al. |
| 2010/0214070 A1 | 8/2010 | Ramsay et al. |
| 2018/0189449 A1* | 7/2018 | Karumba ............... G16H 40/20 |
| 2021/0172918 A1* | 6/2021 | Abdi .................. G01N 33/0031 |
| 2023/0116961 A1* | 4/2023 | Braathen .............. G06Q 20/384 |
| | | 705/40 |

* cited by examiner

*Primary Examiner* — Amy Ng
(74) *Attorney, Agent, or Firm* — Kaufman & Canoles P.C.

(57) ABSTRACT

Systems and methods of tracking utilization of tableware are presented. In one exemplary embodiment, a method of maintaining a historical record of food allergen exposure to tableware is performed by an electronic device having a sensing device operable to sense an identifier specific to and disposed with tableware. The tableware identifier is specific to a cryptographic digital asset stored on the blockchain as a code that represents the tableware identifier. Further, the cryptographic digital asset includes a reference to information that represents a historical record of any food allergen exposure to the tableware. The tableware identifier code and the food allergen exposure information reference are included with the cryptographic digital asset. The method includes sending, to the blockchain, an indication that includes a request for block data associated with the cryptographic digital asset based on the tableware Identifier disposed on the tableware that is sensed by the sensing device.

20 Claims, 11 Drawing Sheets

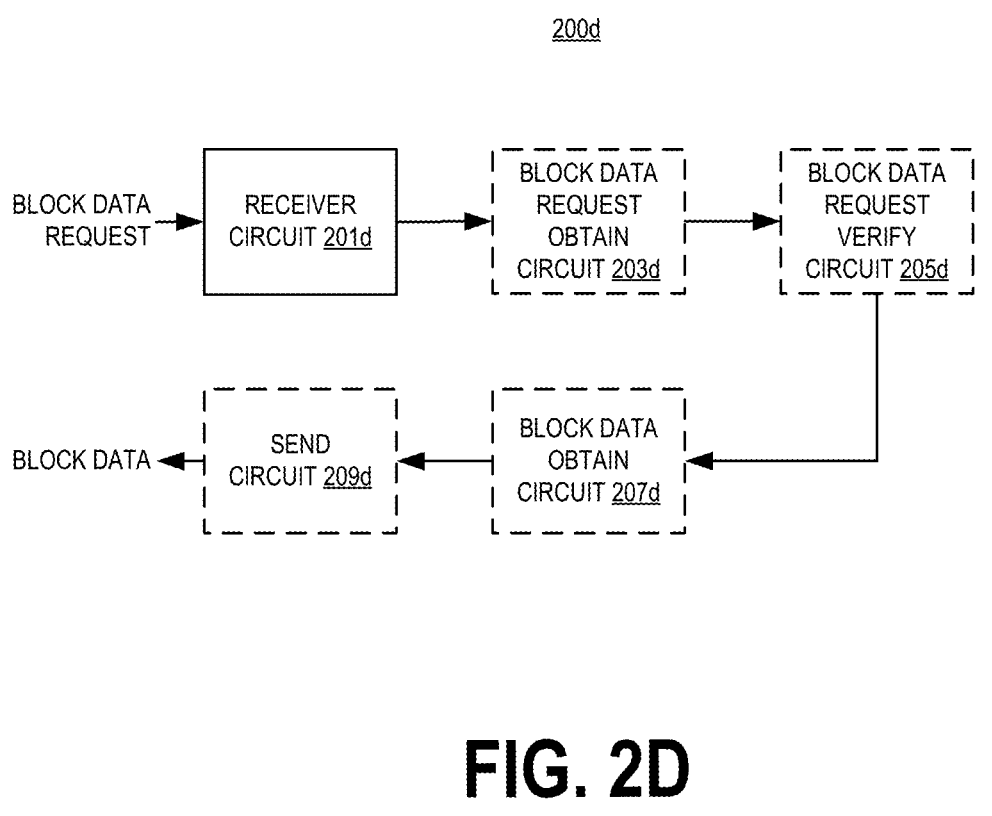

200d

```
BLOCK DATA  ──▶  ┌─────────────┐  ──▶  ┌─────────────┐  ──▶  ┌─────────────┐
REQUEST           │  RECEIVER   │        │ BLOCK DATA  │        │ BLOCK DATA  │
                  │ CIRCUIT 201d│        │  REQUEST    │        │  REQUEST    │
                  │             │        │  OBTAIN     │        │  VERIFY     │
                  └─────────────┘        │ CIRCUIT 203d│        │ CIRCUIT 205d│
                                         └─────────────┘        └─────────────┘

BLOCK DATA  ◀──  ┌─────────────┐  ◀──  ┌─────────────┐  ◀──
                  │    SEND     │        │ BLOCK DATA  │
                  │ CIRCUIT 209d│        │   OBTAIN    │
                  │             │        │ CIRCUIT 207d│
                  └─────────────┘        └─────────────┘
```

FIG. 2D

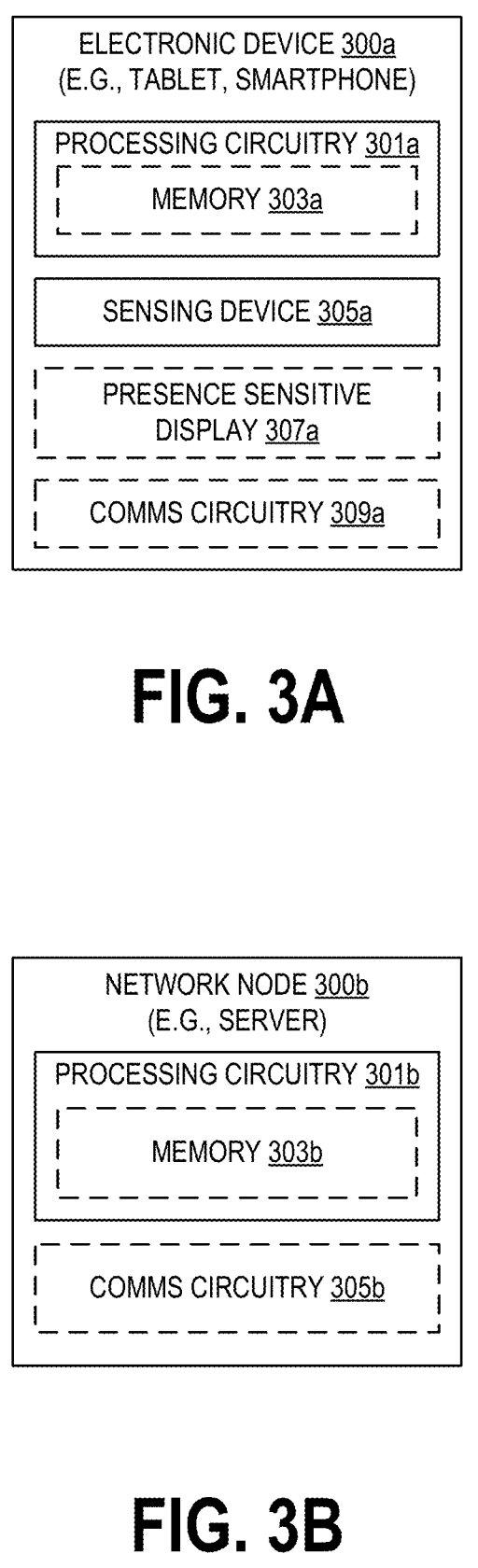

ELECTRONIC DEVICE 300a
(E.G., TABLET, SMARTPHONE)

PROCESSING CIRCUITRY 301a

MEMORY 303a

SENSING DEVICE 305a

PRESENCE SENSITIVE
DISPLAY 307a

COMMS CIRCUITRY 309a

FIG. 3A

NETWORK NODE 300b
(E.G., SERVER)

PROCESSING CIRCUITRY 301b

MEMORY 303b

COMMS CIRCUITRY 305b

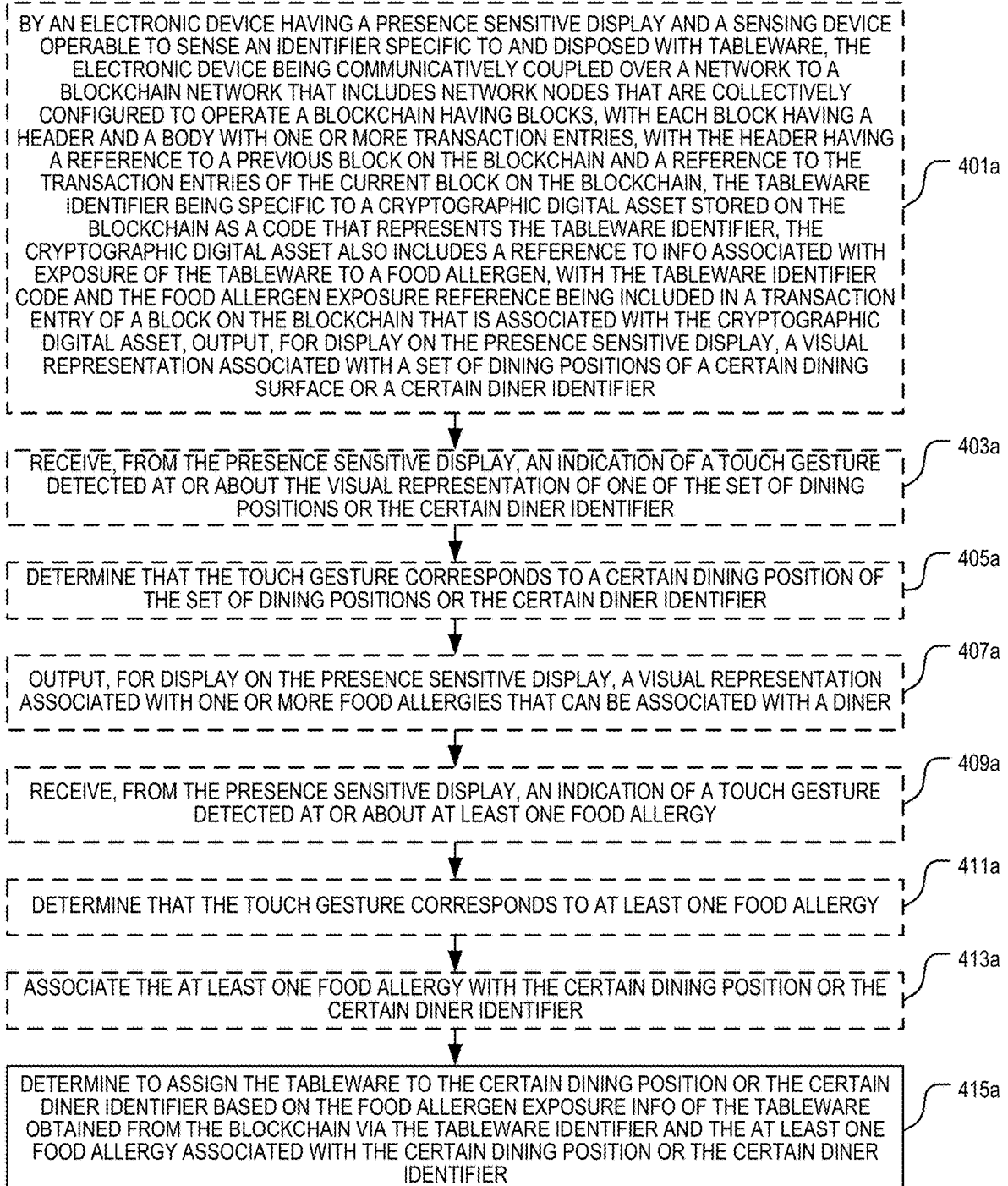

BY AN ELECTRONIC DEVICE HAVING A PRESENCE SENSITIVE DISPLAY AND A SENSING DEVICE OPERABLE TO SENSE AN IDENTIFIER SPECIFIC TO AND DISPOSED WITH TABLEWARE, THE ELECTRONIC DEVICE BEING COMMUNICATIVELY COUPLED OVER A NETWORK TO A BLOCKCHAIN NETWORK THAT INCLUDES NETWORK NODES THAT ARE COLLECTIVELY CONFIGURED TO OPERATE A BLOCKCHAIN HAVING BLOCKS, WITH EACH BLOCK HAVING A HEADER AND A BODY WITH ONE OR MORE TRANSACTION ENTRIES, WITH THE HEADER HAVING A REFERENCE TO A PREVIOUS BLOCK ON THE BLOCKCHAIN AND A REFERENCE TO THE TRANSACTION ENTRIES OF THE CURRENT BLOCK ON THE BLOCKCHAIN, THE TABLEWARE IDENTIFIER BEING SPECIFIC TO A CRYPTOGRAPHIC DIGITAL ASSET STORED ON THE BLOCKCHAIN AS A CODE THAT REPRESENTS THE TABLEWARE IDENTIFIER, THE CRYPTOGRAPHIC DIGITAL ASSET ALSO INCLUDES A REFERENCE TO INFO ASSOCIATED WITH EXPOSURE OF THE TABLEWARE TO A FOOD ALLERGEN, WITH THE TABLEWARE IDENTIFIER CODE AND THE FOOD ALLERGEN EXPOSURE REFERENCE BEING INCLUDED IN A TRANSACTION ENTRY OF A BLOCK ON THE BLOCKCHAIN THAT IS ASSOCIATED WITH THE CRYPTOGRAPHIC DIGITAL ASSET, OUTPUT, FOR DISPLAY ON THE PRESENCE SENSITIVE DISPLAY, A VISUAL REPRESENTATION ASSOCIATED WITH A SET OF DINING POSITIONS OF A CERTAIN DINING SURFACE OR A CERTAIN DINER IDENTIFIER — 401a

RECEIVE, FROM THE PRESENCE SENSITIVE DISPLAY, AN INDICATION OF A TOUCH GESTURE DETECTED AT OR ABOUT THE VISUAL REPRESENTATION OF ONE OF THE SET OF DINING POSITIONS OR THE CERTAIN DINER IDENTIFIER — 403a

DETERMINE THAT THE TOUCH GESTURE CORRESPONDS TO A CERTAIN DINING POSITION OF THE SET OF DINING POSITIONS OR THE CERTAIN DINER IDENTIFIER — 405a

OUTPUT, FOR DISPLAY ON THE PRESENCE SENSITIVE DISPLAY, A VISUAL REPRESENTATION ASSOCIATED WITH ONE OR MORE FOOD ALLERGIES THAT CAN BE ASSOCIATED WITH A DINER — 407a

RECEIVE, FROM THE PRESENCE SENSITIVE DISPLAY, AN INDICATION OF A TOUCH GESTURE DETECTED AT OR ABOUT AT LEAST ONE FOOD ALLERGY — 409a

DETERMINE THAT THE TOUCH GESTURE CORRESPONDS TO AT LEAST ONE FOOD ALLERGY — 411a

ASSOCIATE THE AT LEAST ONE FOOD ALLERGY WITH THE CERTAIN DINING POSITION OR THE CERTAIN DINER IDENTIFIER — 413a

DETERMINE TO ASSIGN THE TABLEWARE TO THE CERTAIN DINING POSITION OR THE CERTAIN DINER IDENTIFIER BASED ON THE FOOD ALLERGEN EXPOSURE INFO OF THE TABLEWARE OBTAINED FROM THE BLOCKCHAIN VIA THE TABLEWARE IDENTIFIER AND THE AT LEAST ONE FOOD ALLERGY ASSOCIATED WITH THE CERTAIN DINING POSITION OR THE CERTAIN DINER IDENTIFIER — 415a

FIG. 4A

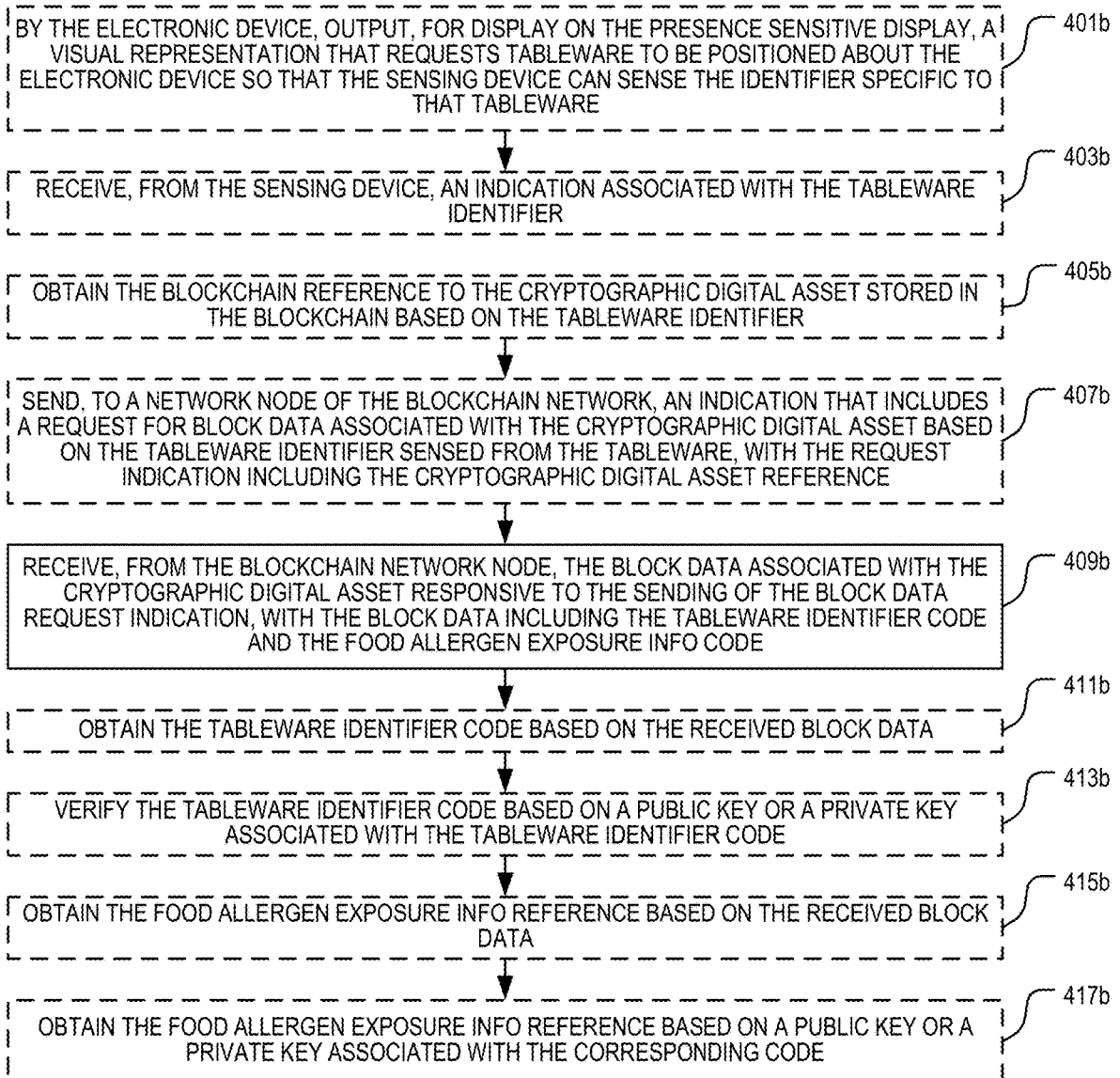

400b

BY THE ELECTRONIC DEVICE, OUTPUT, FOR DISPLAY ON THE PRESENCE SENSITIVE DISPLAY, A VISUAL REPRESENTATION THAT REQUESTS TABLEWARE TO BE POSITIONED ABOUT THE ELECTRONIC DEVICE SO THAT THE SENSING DEVICE CAN SENSE THE IDENTIFIER SPECIFIC TO THAT TABLEWARE — 401b

RECEIVE, FROM THE SENSING DEVICE, AN INDICATION ASSOCIATED WITH THE TABLEWARE IDENTIFIER — 403b

OBTAIN THE BLOCKCHAIN REFERENCE TO THE CRYPTOGRAPHIC DIGITAL ASSET STORED IN THE BLOCKCHAIN BASED ON THE TABLEWARE IDENTIFIER — 405b

SEND, TO A NETWORK NODE OF THE BLOCKCHAIN NETWORK, AN INDICATION THAT INCLUDES A REQUEST FOR BLOCK DATA ASSOCIATED WITH THE CRYPTOGRAPHIC DIGITAL ASSET BASED ON THE TABLEWARE IDENTIFIER SENSED FROM THE TABLEWARE, WITH THE REQUEST INDICATION INCLUDING THE CRYPTOGRAPHIC DIGITAL ASSET REFERENCE — 407b

RECEIVE, FROM THE BLOCKCHAIN NETWORK NODE, THE BLOCK DATA ASSOCIATED WITH THE CRYPTOGRAPHIC DIGITAL ASSET RESPONSIVE TO THE SENDING OF THE BLOCK DATA REQUEST INDICATION, WITH THE BLOCK DATA INCLUDING THE TABLEWARE IDENTIFIER CODE AND THE FOOD ALLERGEN EXPOSURE INFO CODE — 409b

OBTAIN THE TABLEWARE IDENTIFIER CODE BASED ON THE RECEIVED BLOCK DATA — 411b

VERIFY THE TABLEWARE IDENTIFIER CODE BASED ON A PUBLIC KEY OR A PRIVATE KEY ASSOCIATED WITH THE TABLEWARE IDENTIFIER CODE — 413b

OBTAIN THE FOOD ALLERGEN EXPOSURE INFO REFERENCE BASED ON THE RECEIVED BLOCK DATA — 415b

OBTAIN THE FOOD ALLERGEN EXPOSURE INFO REFERENCE BASED ON A PUBLIC KEY OR A PRIVATE KEY ASSOCIATED WITH THE CORRESPONDING CODE — 417b

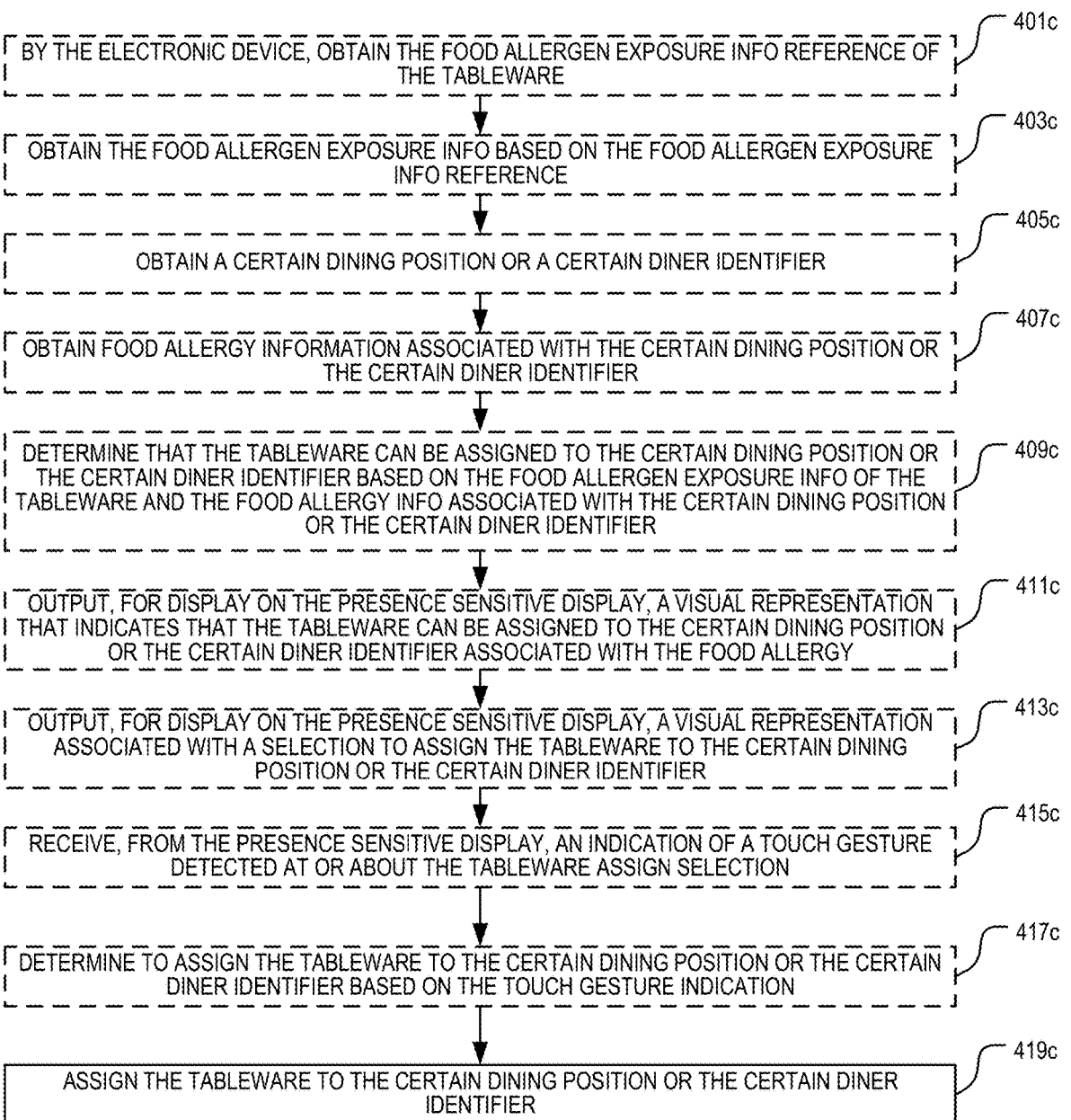

BY THE ELECTRONIC DEVICE, OBTAIN THE FOOD ALLERGEN EXPOSURE INFO REFERENCE OF THE TABLEWARE — 401c

OBTAIN THE FOOD ALLERGEN EXPOSURE INFO BASED ON THE FOOD ALLERGEN EXPOSURE INFO REFERENCE — 403c

OBTAIN A CERTAIN DINING POSITION OR A CERTAIN DINER IDENTIFIER — 405c

OBTAIN FOOD ALLERGY INFORMATION ASSOCIATED WITH THE CERTAIN DINING POSITION OR THE CERTAIN DINER IDENTIFIER — 407c

DETERMINE THAT THE TABLEWARE CAN BE ASSIGNED TO THE CERTAIN DINING POSITION OR THE CERTAIN DINER IDENTIFIER BASED ON THE FOOD ALLERGEN EXPOSURE INFO OF THE TABLEWARE AND THE FOOD ALLERGY INFO ASSOCIATED WITH THE CERTAIN DINING POSITION OR THE CERTAIN DINER IDENTIFIER — 409c

OUTPUT, FOR DISPLAY ON THE PRESENCE SENSITIVE DISPLAY, A VISUAL REPRESENTATION THAT INDICATES THAT THE TABLEWARE CAN BE ASSIGNED TO THE CERTAIN DINING POSITION OR THE CERTAIN DINER IDENTIFIER ASSOCIATED WITH THE FOOD ALLERGY — 411c

OUTPUT, FOR DISPLAY ON THE PRESENCE SENSITIVE DISPLAY, A VISUAL REPRESENTATION ASSOCIATED WITH A SELECTION TO ASSIGN THE TABLEWARE TO THE CERTAIN DINING POSITION OR THE CERTAIN DINER IDENTIFIER — 413c

RECEIVE, FROM THE PRESENCE SENSITIVE DISPLAY, AN INDICATION OF A TOUCH GESTURE DETECTED AT OR ABOUT THE TABLEWARE ASSIGN SELECTION — 415c

DETERMINE TO ASSIGN THE TABLEWARE TO THE CERTAIN DINING POSITION OR THE CERTAIN DINER IDENTIFIER BASED ON THE TOUCH GESTURE INDICATION — 417c

ASSIGN THE TABLEWARE TO THE CERTAIN DINING POSITION OR THE CERTAIN DINER IDENTIFIER — 419c

FIG. 4C

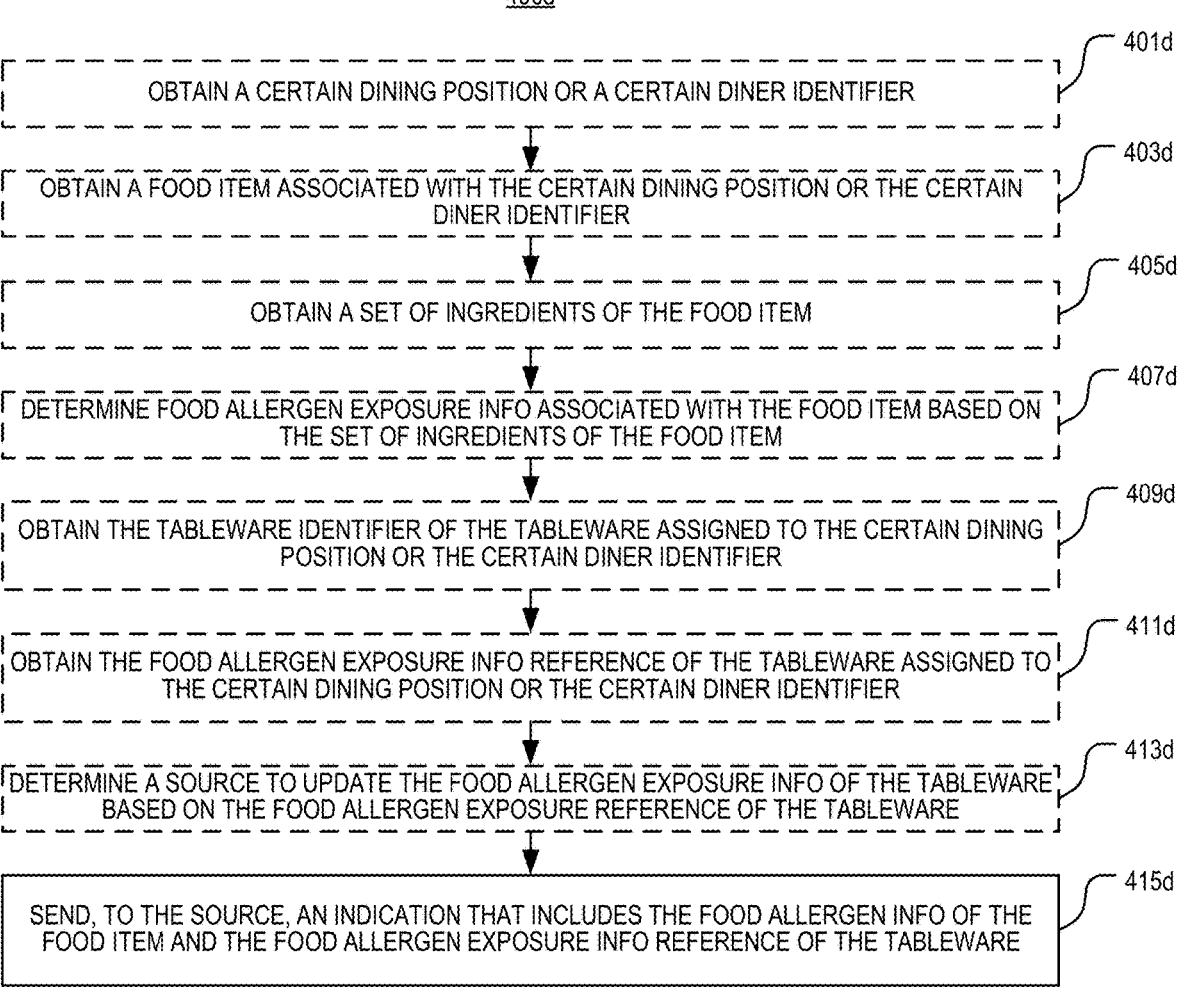

400d

401d — OBTAIN A CERTAIN DINING POSITION OR A CERTAIN DINER IDENTIFIER

403d — OBTAIN A FOOD ITEM ASSOCIATED WITH THE CERTAIN DINING POSITION OR THE CERTAIN DINER IDENTIFIER

405d — OBTAIN A SET OF INGREDIENTS OF THE FOOD ITEM

407d — DETERMINE FOOD ALLERGEN EXPOSURE INFO ASSOCIATED WITH THE FOOD ITEM BASED ON THE SET OF INGREDIENTS OF THE FOOD ITEM

409d — OBTAIN THE TABLEWARE IDENTIFIER OF THE TABLEWARE ASSIGNED TO THE CERTAIN DINING POSITION OR THE CERTAIN DINER IDENTIFIER

411d — OBTAIN THE FOOD ALLERGEN EXPOSURE INFO REFERENCE OF THE TABLEWARE ASSIGNED TO THE CERTAIN DINING POSITION OR THE CERTAIN DINER IDENTIFIER

413d — DETERMINE A SOURCE TO UPDATE THE FOOD ALLERGEN EXPOSURE INFO OF THE TABLEWARE BASED ON THE FOOD ALLERGEN EXPOSURE REFERENCE OF THE TABLEWARE

415d — SEND, TO THE SOURCE, AN INDICATION THAT INCLUDES THE FOOD ALLERGEN INFO OF THE FOOD ITEM AND THE FOOD ALLERGEN EXPOSURE INFO REFERENCE OF THE TABLEWARE

FIG. 4D

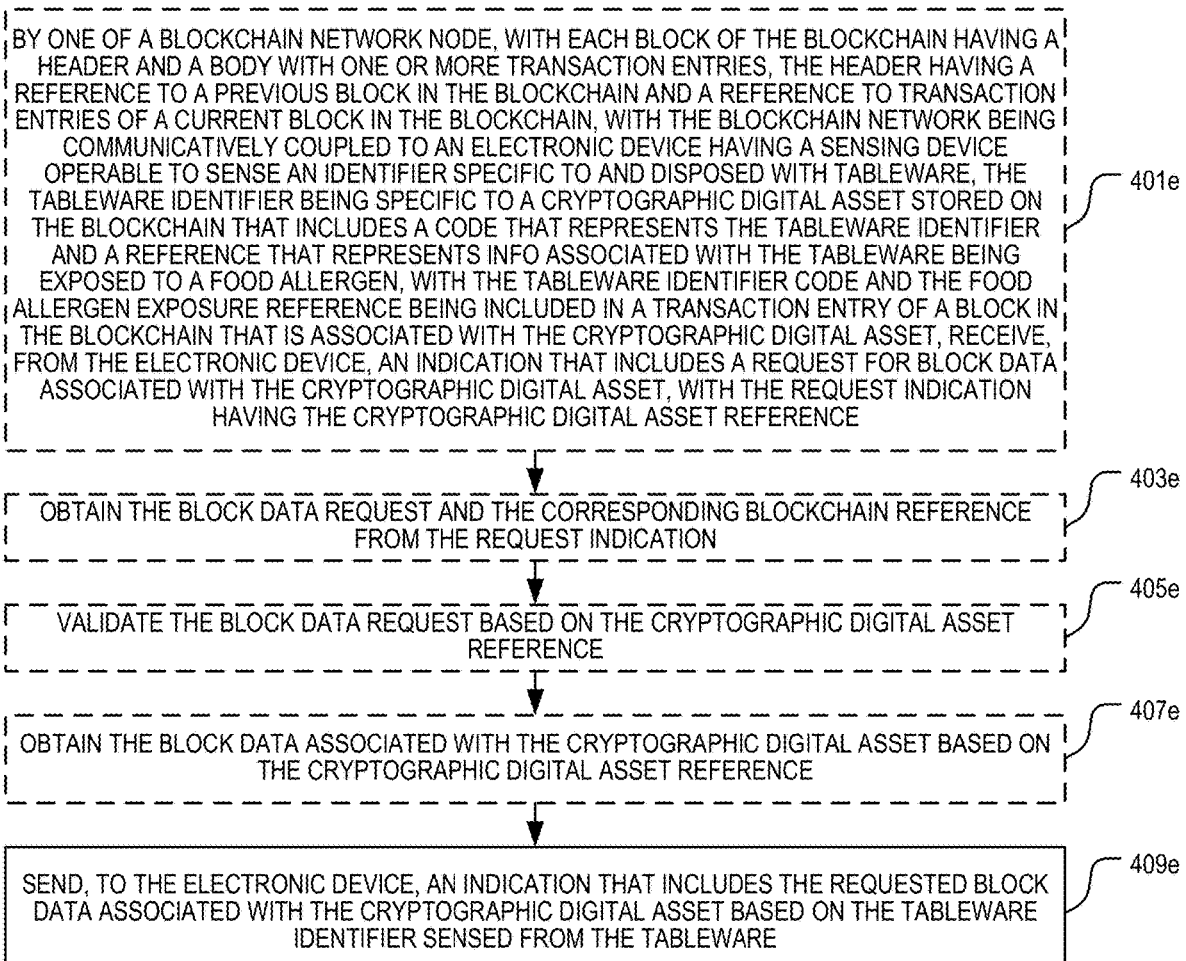

400e

BY ONE OF A BLOCKCHAIN NETWORK NODE, WITH EACH BLOCK OF THE BLOCKCHAIN HAVING A HEADER AND A BODY WITH ONE OR MORE TRANSACTION ENTRIES, THE HEADER HAVING A REFERENCE TO A PREVIOUS BLOCK IN THE BLOCKCHAIN AND A REFERENCE TO TRANSACTION ENTRIES OF A CURRENT BLOCK IN THE BLOCKCHAIN, WITH THE BLOCKCHAIN NETWORK BEING COMMUNICATIVELY COUPLED TO AN ELECTRONIC DEVICE HAVING A SENSING DEVICE OPERABLE TO SENSE AN IDENTIFIER SPECIFIC TO AND DISPOSED WITH TABLEWARE, THE TABLEWARE IDENTIFIER BEING SPECIFIC TO A CRYPTOGRAPHIC DIGITAL ASSET STORED ON THE BLOCKCHAIN THAT INCLUDES A CODE THAT REPRESENTS THE TABLEWARE IDENTIFIER AND A REFERENCE THAT REPRESENTS INFO ASSOCIATED WITH THE TABLEWARE BEING EXPOSED TO A FOOD ALLERGEN, WITH THE TABLEWARE IDENTIFIER CODE AND THE FOOD ALLERGEN EXPOSURE REFERENCE BEING INCLUDED IN A TRANSACTION ENTRY OF A BLOCK IN THE BLOCKCHAIN THAT IS ASSOCIATED WITH THE CRYPTOGRAPHIC DIGITAL ASSET, RECEIVE, FROM THE ELECTRONIC DEVICE, AN INDICATION THAT INCLUDES A REQUEST FOR BLOCK DATA ASSOCIATED WITH THE CRYPTOGRAPHIC DIGITAL ASSET, WITH THE REQUEST INDICATION HAVING THE CRYPTOGRAPHIC DIGITAL ASSET REFERENCE

401e

OBTAIN THE BLOCK DATA REQUEST AND THE CORRESPONDING BLOCKCHAIN REFERENCE FROM THE REQUEST INDICATION

403e

VALIDATE THE BLOCK DATA REQUEST BASED ON THE CRYPTOGRAPHIC DIGITAL ASSET REFERENCE

405e

OBTAIN THE BLOCK DATA ASSOCIATED WITH THE CRYPTOGRAPHIC DIGITAL ASSET BASED ON THE CRYPTOGRAPHIC DIGITAL ASSET REFERENCE

407e

SEND, TO THE ELECTRONIC DEVICE, AN INDICATION THAT INCLUDES THE REQUESTED BLOCK DATA ASSOCIATED WITH THE CRYPTOGRAPHIC DIGITAL ASSET BASED ON THE TABLEWARE IDENTIFIER SENSED FROM THE TABLEWARE

TABLEWARE UTILIZATION TRACKING SYSTEM

BACKGROUND

Food safety is an essential aspect of providing food services. Further, exposure or contamination to food allergens represents a critical area of food safety. The major food allergens are typically recognized as milk, eggs, fish, shellfish, tree nuts, peanuts, wheat, and soy. While current U.S. Food and Drug Administration (FDA) labeling regulations require manufacturers to label foods that contain an ingredient that is or contains a protein from these major food allergens, restaurants do not have requirements to provide ingredient lists. In addition, there are no FDA labeling regulations for other food allergens outside these major food allergens. Restaurants can also prepare food at times in a chaotic environment outside of a diner's control, which can include the re-use of certain tableware in preparing or serving different foods. As such, a diner that is susceptible to a certain food allergen may take a life-threatening risk with hopes that the food is safe for consumption without exposure to that food allergen.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

FIG. 2D illustrates one embodiment of a network node device of a blockchain network in accordance with various aspects as described herein.

FIG. 3A illustrates another embodiment of an electronic device in accordance with various aspects as described herein. FIG. 3B illustrates another embodiment of a network node device in accordance with various aspects as described herein.

FIGS. 4A-4E illustrate embodiments of a method of tracking tableware utilization in accordance with various aspects as described herein.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

When a diner that is susceptible to a certain food allergy dines at a restaurant, the diner does not select which tableware to use while dining. In addition, during food preparation, serving or dining such as at home or in a restaurant, the used tableware is not tracked as to which food allergens that tableware was exposed. Further, the used tableware may include remnants of one or more food allergens even though that tableware may have been subsequently cleaned. As such, a diner having a certain food allergy may be unknowingly exposed to the corresponding food allergen by using tableware previously contaminated by that allergen during food preparation, serving or dining. Using blockchain technology, each tableware can be tracked as an asset on a blockchain. Whenever tableware is used for food preparation, serving or dining, or cleaned or sanitized, the food or food allergen information could be stored as a transaction on the blockchain associated with that asset so as to maintain a running record of the food or food allergen exposure of that asset. When tableware is determined to have been exposed to a food allergen, then that tableware can be flagged from being used by a diner that is susceptible to the corresponding allergy. Further, the tableware can be indicated as safe for preparing, serving or dining such as after a certain number or type of cleaning or sanitizing.

Figure 1:
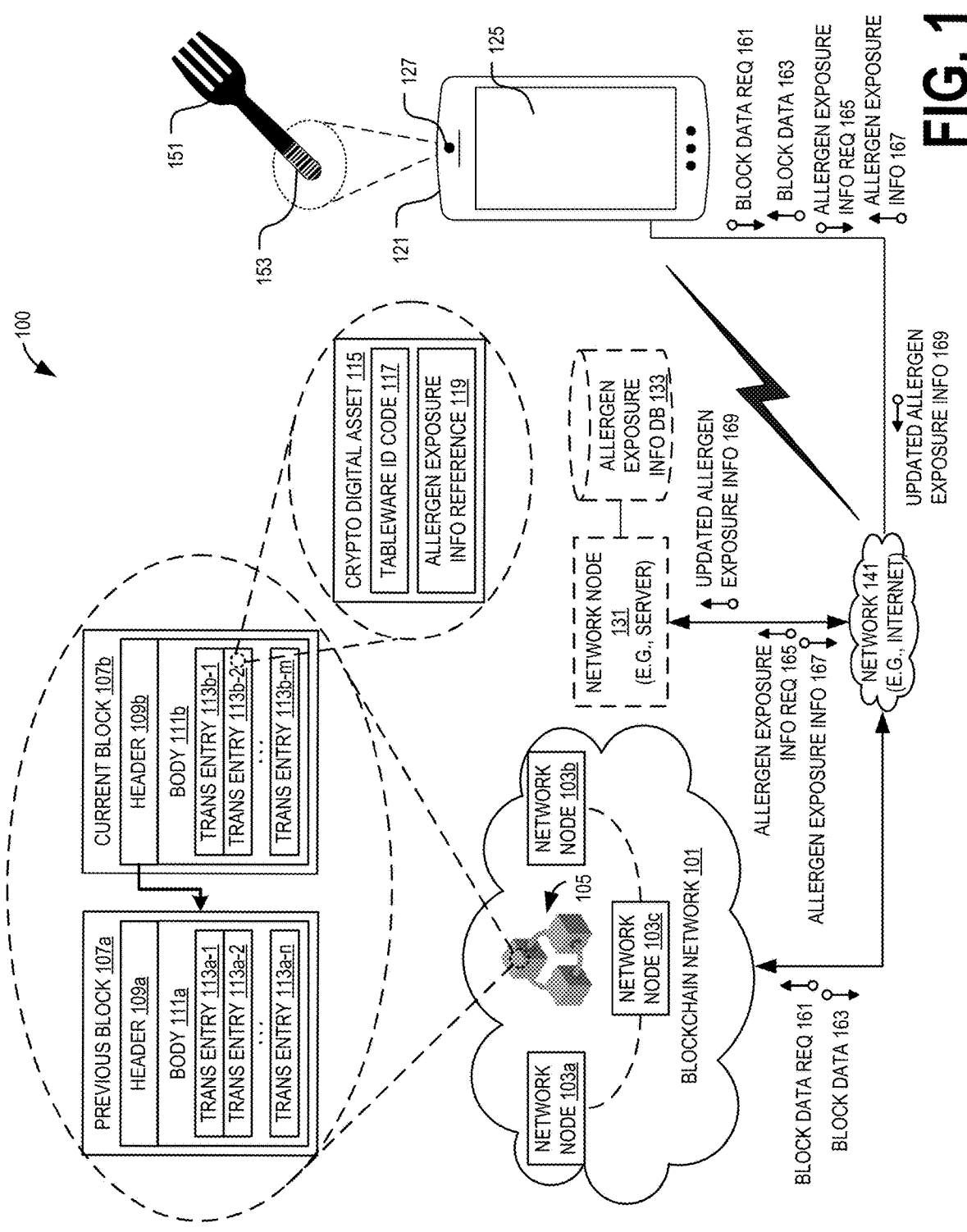
FIG. 1 illustrates one embodiment of a system of tracking tableware utilization in accordance with various aspects as described herein.

This disclosure further includes systems and methods of tracking tableware utilization. For example, FIG. 1 illustrates one embodiment of a system 100 of tracking tableware utilization in accordance with various aspects as described herein. In FIG. 1, the system 100 includes an electronic device 121 (e.g., self-checkout device, assisted checkout device, self-service checkout device, checkout device, smartphone, wireless device, tablet, computer, network node) coupled to a blockchain network 101 and a network node 131 (e.g., server) over a network 141 (e.g., Internet, intranet). The electronic device 121 can include a sensing device 127 (e.g., camera, QR or bar code scanner, RFID device, NFC device, the like, or any combination thereof. The electronic device 121 can be operable to obtain a value of a sensed tableware identifier 153 (e.g., QR code, barcode, RFID, NFC device) disposed with tableware 151 (e.g., glassware, place settings, silverware, dishes, forks, glasses, knives, spoons, utensils) and captured by the sensing device 127 while the tableware 151 is positioned about or near the sensing device 127. The tableware identifier 153 can be unique to a set or any subset of tableware. In one example, each tableware has a unique identifier. In another example, each tableware specific to serving has a unique identifier. In yet another example, each tableware for a certain restaurant has a unique identifier. In yet another example, each place setting has a unique identifier. The sensing device 127 can include an RFID detector device that is operable to detect an RFID tag disposed with tableware 151. Further, the sensing device 127 can include a near field communication (NFC) device that is operable to communicate with an NFC device disposed with the tableware 151. The electronic device 121 can also include a presence sensitive display device 125 (e.g., touchscreen display).

In FIG. 1, the blockchain network 101 can be a network having a set of network nodes 103a-c (e.g., servers) that are configured to store and manage a blockchain 105, including the generation, verification, and addition of new blocks to the blockchain 105. The blockchain 105 can include a set of blocks 107a-b, with each block 107a-b having a block header 109a-b and a body 111a-b having a set of transaction entries 113a-1-n, 113b-1-m. The block header 109b of a current block 107b can include a reference to a previous block 107a, a timestamp that represents a time when the current block 107b was generated, a reference to the set of transaction entries 113b-1 to 113b-m included in the current block 107*b*, the like, or any combination thereof. Every block 107*a-b* on the blockchain 105 can be verified by determining the reference values using the associated hashing function. The references included on the blockchain 105 can be hash values generated by applying one or more hashing algorithms to the corresponding data. In one example, the reference to the previous block 107*a* can be a hash value generated by applying a hashing algorithm to the block header 109*a* of the previous block 107*a*. The use of the references reflects the immutability of the blockchain 105, as a change to any transaction entry 113*a*-1-*n*, 113*b*-1-*m* on the blockchain 105 would result in a different reference value, which would result in the block header 109*a-b* of the corresponding block 107*a-b* to be changed, which in turn would result in a difference reference value for that block header 109*a-b*, requiring the block headers of all previous blocks to change. The set of transaction entries 113*a*-1-*n*, 113*b*-1-*m* can be represented by a hash tree. For example, the set of transaction entries 113*a*-1-*n*, 113*b*-1-*m* can be represented by a Merkle tree. A Merkle tree is a hash-based tree structure with each leaf node being a hash of a block 107*a-b*, and each non-leaf node being a hash of the children of each block 107*a-b*. Merkle trees can have a branching factor of two with each node having up to two children.

Each transaction entry 113*a*-1-*n*, 113*b*-1-*m* may represent a cryptographic digital asset 115 of the tableware 151 that includes a code 117 associated with the tableware identifier 153. Further, each cryptographic digital asset 115 can include a reference 119 (coded or uncoded) to information associated with the tableware 151 being exposed to a food allergen. In one example, a food allergen can include any food that can cause food hypersensitivity in one or more body organs or systems. In another example, a food allergen can include any food that can cause a detrimental reaction in one or more body organs or systems. In yet another example, a food allergen is associated with food intolerances. The food allergen exposure information can be associated with the name or type of food item(s) that exposed the tableware, one or more ingredients of each food item, the name or type of food allergen(s) of each food item, the date/time of each exposure, the location (e.g., GPS coordinate, map coordinate, restaurant name, table, seating location) of each exposure, the type of exposure (e.g., food preparation, serving, dining), the date/time the tableware was cleaned, the type of cleaning, an indication that the tableware is available for use, an indication that the tableware should be cleaned, the like, or any combination thereof.

The blockchain 105 can include security methods such as the use of public key cryptography, which may also be referred to as asymmetric key cryptography or encryption. Public key cryptography uses pairs of mathematically-related keys (e.g., one public key and one private key) to authenticate data. The private key can be kept secret and can be used to decrypt data. The public key can be shared and can be used to authenticate or encrypt the data. Further, a private key is like a password that enables access to the corresponding cryptographic digital asset or the means to otherwise interact with the various capabilities that the blockchain 105 can support. The tableware identifier code 117 can include a cryptographic token and a public or private key. The cryptographic digital asset 115 can be transferred to a digital wallet of another user with the tableware identifier code 117 being sent to a blockchain node 103*a-c* of the blockchain 105 and recorded on a new block to confirm the transfer of that cryptographic digital asset 115. Each transfer of a cryptographic digital asset 115 to a digital wallet of a user may include sending an electronic message (e.g., email, text message) to the user with a unique key and a hashed address to the cryptographic digital asset 115. A skilled artisan will readily recognize that any type of information can be stored in a transaction entry of a block and that data so stored may be stored in publicly readable form or in encrypted form depending on the use in which that particular blockchain is intended. While in one embodiment, the tableware identifier or the food allergen exposure information reference may be encrypted as a code, in another embodiment, the tableware identifier or the food allergen exposure information reference may be provided in publicly available form depending on the use in which the blockchain is intended.

In operation, the electronic device 121 can output, for display on the presence sensitive display 125 (e.g., touch screen display), a visual representation associated with a set of dining positions (e.g., table seats, place settings) of a certain dining surface (e.g., table, bar) or a certain diner identifier (e.g., name, number, account, user login, anonymized user). In response, the electronic device 121 can receive, from the presence sensitive display 125, an indication of a touch gesture detected at or about the visual representation of the certain dining position or the certain diner identifier. Further, the electronic device 121 can determine that the touch gesture corresponds to the certain dining position or the certain diner identifier. The electronic device 121 can then output, for display on the presence sensitive display 125, a visual representation associated with a selection of one or more food allergies that can be associated with a diner. The electronic device 121 can receive, from the presence sensitive display 125, an indication of a touch gesture detected at or about one or more selected food allergies and can then determine that the touch gesture corresponds to the one or more selected food allergies. The electronic device 121 can associate the one or more selected food allergies with the certain dining position or the certain diner identifier. The electronic device 121 can then determine to assign the tableware 151 to the certain dining position or the certain diner identifier based on the food allergen exposure information of the tableware 151 and the one or more selected food allergies associated with the certain dining position or the certain diner identifier.

Furthermore, the electronic device 121 can output, for display on the presence sensitive display 125, a visual representation associated with sensing the tableware identifier 153 by positioning the tableware 151 about the electronic device 125 so that the sensing device 127 can sense the tableware identifier 153. In response, the electronic device 121 can receive, from the sensing device 127, an indication associated with the tableware identifier 153 and can then determine the tableware identifier value based on the sensed tableware identifier 153. In one example, the tableware identifier 153 is a Quick Response (QR) code or a barcode displayed on an outer surface of the container and the sensing device 127 (e.g., optical scanner, bar code scanner, camera) is operable to capture the QR code or the barcode displayed on the tableware 151. In another example, the tableware identifier 153 is a passive or active RFID tag disposed with the tableware 151 and the sensing device 127 is an RFID detector device operable to sense the RFID device. In yet another example, the tableware identifier 153 is associated with an NFC device and the sensing device 127 is an NFC device that is operable to communicate with the tableware identifier NFC device. The electronic device 121 can then obtain the blockchain reference to the cryptographic digital asset 115 stored on the blockchain 105 based on the tableware identifier 153. In one example, the tableware identifier value includes the blockchain reference. In another example, the tableware identifier value is linked to the blockchain reference such as through a database or user account (e.g., digital wallet). The electronic device 121 can send, to a blockchain network node 103a-c over the network 141, an indication 161 that includes a request for block data associated with the cryptographic digital asset 115 based on the included cryptographic digital asset reference.

The blockchain network node 103a-c can receive the request indication 161 and in response, the blockchain network node 103a-c can obtain the block data request and the corresponding blockchain reference from the request indication 161. Further, the blockchain network node 103a-c can validate the block data request based on the cryptographic digital asset reference. The blockchain network node 103a-c can then obtain the block data associated with the cryptographic digital asset 115 that includes the tableware identifier code 117 and the corresponding food allergen exposure information reference 119. The blockchain network node 103a-c can send, to the electronic device 121 over the network 141, an indication 163 that includes the block data associated with the cryptographic digital asset 115.

The electronic device 121 can receive the block data indication 163 and can obtain the tableware identifier code 117 and the food allergen exposure information reference 119 based on the received block data. Further, the electronic device 121 can verify or authenticate the tableware identifier code 117 based on a public key or a private key associated with the tableware identifier code 117. If the food allergen exposure information reference 119 is coded, then the electronic device 121 can obtain the food allergen exposure information reference 119 based on the corresponding code and a public key or a private key associated with that code. The food allergen exposure information reference 119 represents a reference to information associated with the exposure of any food allergens to the tableware 151. In one example, the food allergen exposure information reference 119 includes a uniform resource locator (URL) to the network node 131 that is configured to have access to the corresponding food allergen exposure information such as stored in a food allergen exposure information database 133. In another example, the food allergen exposure information reference 119 is associated with account information (e.g., URL, user name, password) that enables access to the corresponding food allergen exposure information. In yet another example, the food allergen exposure information reference 119 is associated with a database that stores the corresponding food allergen exposure information such as the food allergen exposure information database 133. In yet another example, the food allergen exposure information reference 119 is associated with the corresponding allergen exposure information stored on the blockchain 105.

In the current embodiment, the electronic device 121 can obtain the food allergen exposure information based on the food allergen exposure information reference 119. The electronic device 121 can then determine whether the tableware 151 can be assigned to the certain dining position or the certain diner identifier based on the food allergen exposure information of the tableware 151 and the food allergy information associated with the certain dining position or the certain diner identifier. In one example, the electronic device 121 can determine that the tableware 151 can be assigned to the certain dining position or the certain diner identifier responsive to determining that the food allergen exposure information of the tableware 151 does not correspond to the food allergy information associated with the certain dining position or the certain diner identifier. In another example, the electronic device 121 can determine that the tableware 151 can be assigned to the certain dining position or the certain diner identifier responsive to determining that the tableware 151 has been cleaned such as a certain number of times or using a certain cleaning method sufficient to remove any food allergen remnants from the tableware 151. In response to determining that the tableware 151 can be assigned, the electronic device 121 can assign the tableware 151 to the certain dining position or the certain diner identifier. In yet another example, the electronic device 121 can determine that the tableware 151 cannot be assigned to the certain dining position or the certain diner identifier responsive to determining that the food allergen exposure information of the tableware 151 corresponds to the food allergy information associated with the certain dining position or the certain diner identifier. In response to determining that the tableware 151 cannot be assigned, the electronic device 121 can send, to the presence sensitive display, a visual representation associated with a request to select another tableware to be assigned to the certain dining position or the certain diner identifier.

In another embodiment, the electronic device 121 can obtain the food allergen exposure information reference 119. The electronic device 121 can then obtain food allergen exposure information specific to the tableware 151 based on the food allergen exposure information reference 119. In one example, the electronic device 121 can query the food allergen exposure information database 133 based on the food allergen exposure information reference 119, with the electronic device 121 being configured to access that database directly or through a network node. In another example, the electronic device 121 can send, to the network node 131 over the network 141, an indication 165 that includes a request for food allergen exposure information specific to the tableware 151, which includes the food allergen exposure information reference 119. The network node 131 can receive the request and in response, obtain food allergen exposure information specific to the tableware 151 based on the food allergen exposure information reference 119 such as from the food allergen exposure information database 133 configured to enable access to the food allergen exposure information stored in that database 133. Further, the database 133 can be configured to: create, modify and remove definitions that define the organization of the food allergen exposure information; insert, modify or delete data, provide data in a form directly usable or for further processing by other applications; or register or monitor users, enforce data security, monitor performance, maintain data integrity, deal with concurrency control, and recover information that has been corrupted by some event (e.g., unexpected system failure). The network node 131 can then send, to the electronic device 121 over the network 141, an indication 167 that includes the food allergen exposure information specific to the tableware 151.

In another embodiment, the electronic device 121 can determine a source (e.g., network node 103a-c, 131, database 133, blockchain 105, another network node) of allergen exposure information associated with the utilization of the tableware 151 based on the food allergen exposure information reference 119. The electronic device 121 can send, to the source, an indication that includes the obtained food allergen exposure information specific to the tableware 151, which can include the food allergen exposure information reference 119, the cryptographic digital asset reference, or diner identifier associated with a user of the tableware 151. The source can receive that indication and in response, store the food allergen exposure information based on the food allergen exposure information reference 119, the cryptographic digital asset reference, or another reference. By doing so, the food allergen exposure information specific to the tableware 151 can be generated, updated, and tracked such as to assign the tableware 151, provide cleaning instructions for the tableware 151, or the like.

In another embodiment, the network node 131 can receive, from the electronic device 121 over the network 141, an indication 169 that includes updated food allergen exposure information specific to the tableware 151 and the food allergen exposure information reference 119. The network node 131 can obtain the food allergen exposure information specific to the tableware 151 based on the food allergen exposure information reference 119.

In another embodiment, the electronic device 121 or the network node 131 can send, to a blockchain network node 103a-c, an indication that includes a request to register a new transaction on the blockchain 105, the tableware identifier code 117, the food allergen exposure information reference (coded or uncoded) 119, and the transaction information associated with the food allergen exposure information of the tableware 151. The blockchain network node 103a-c receives this request indication and in response, registers a new transaction on the blockchain 105 that includes the tableware identifier code 117, the food allergen exposure information reference (coded or unencoded) 119, and the transaction information associated with the food allergen exposure information of the tableware 151.

Figure 2A:
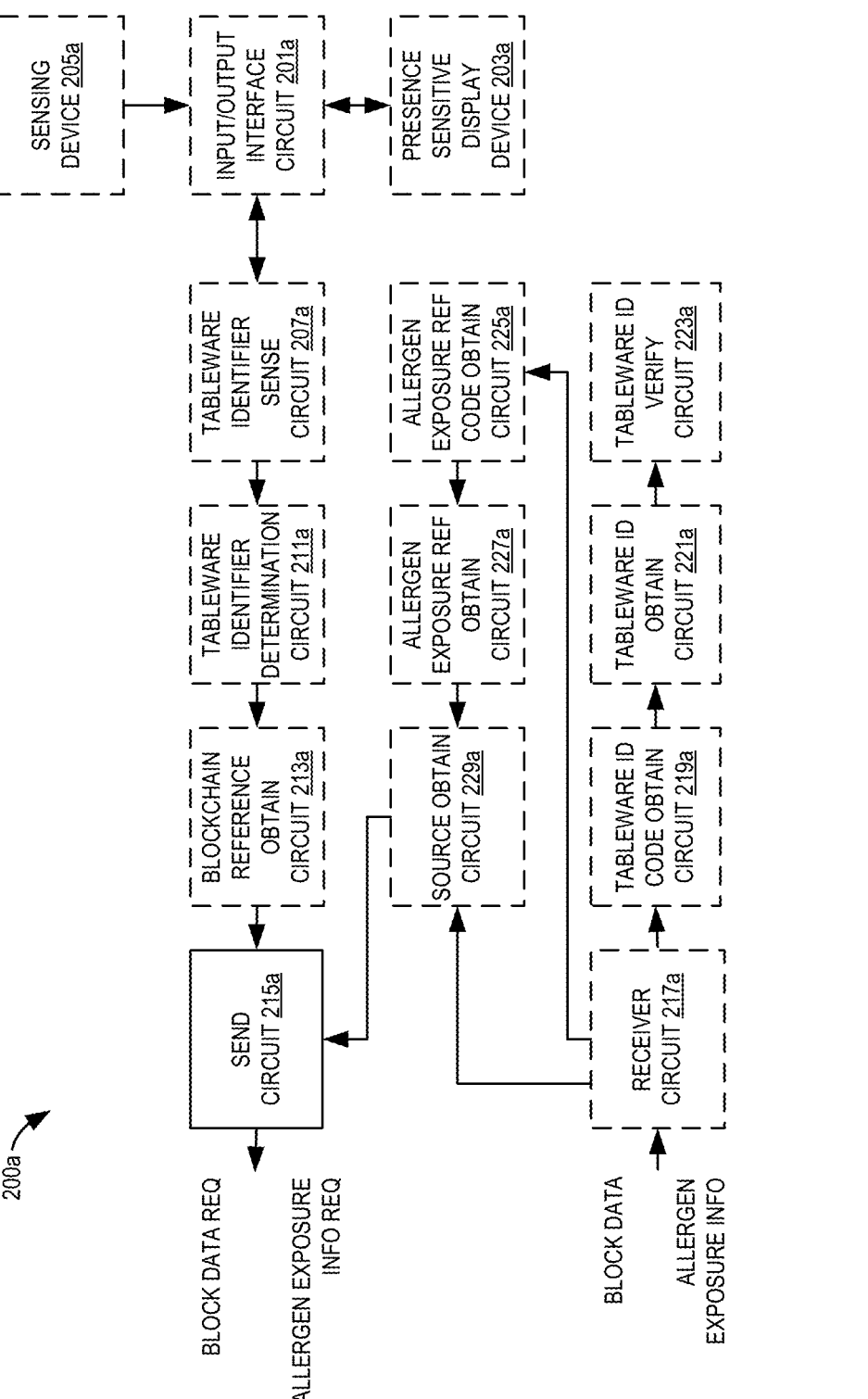
FIGS. 2A-2C illustrate embodiments of an electronic device in accordance with various aspects as described herein.
Figure 2B:
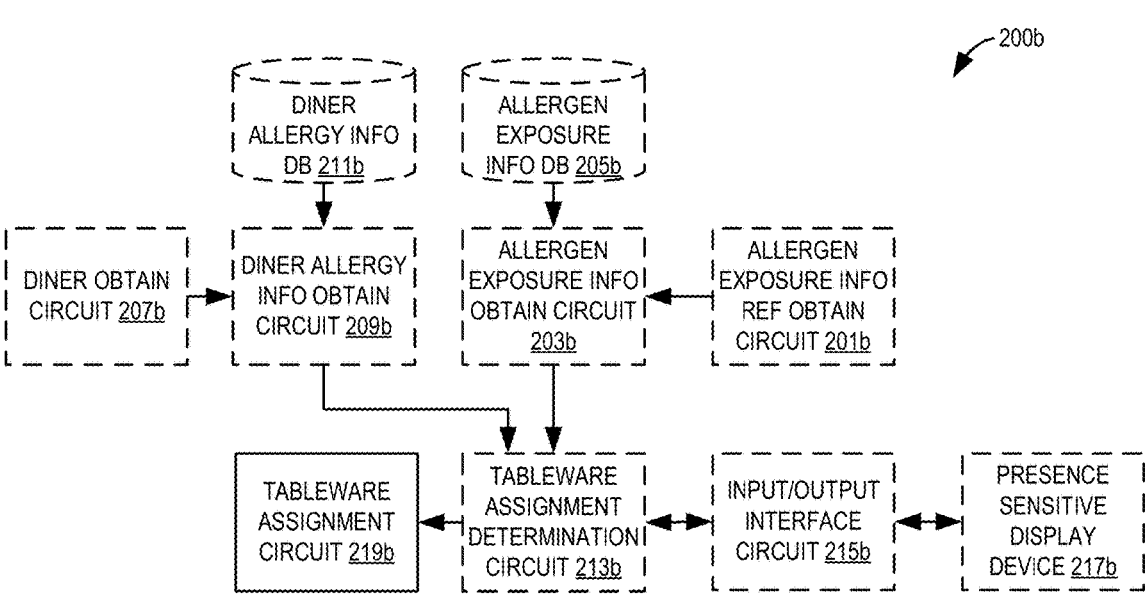
Figure 2C:
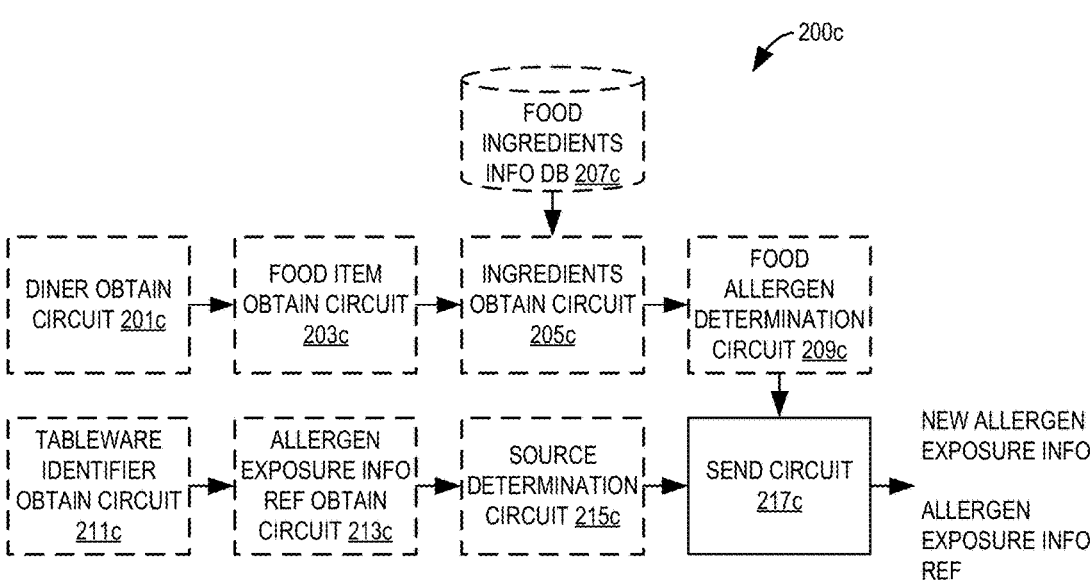

FIGS. 2A-2C illustrate embodiments of an electronic device 200a-c in accordance with various aspects as described herein. In FIG. 2A, the device 200a implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) described herein) may include for instance: an input/output interface circuit 201a operable to provide a communication interface to an input device, output device, or input and output device such as a presence sensitive display device 203a (e.g., touchpad display), a sensing device 205a (e.g., camera, QR or bar code scanner, RFID device, NFC device), LED, keypad, payment reader, printer, credit card reader, the like, or any combination thereof; a tableware identifier sense circuit 207a operable to obtain a sensed tableware identifier from the sensing device 205a via the input/output interface circuit 201a; a tableware identifier determination circuit 211a operable to obtain a tableware identifier value from the sensed tableware identifier; a blockchain reference obtain circuit 213a operable to obtain a blockchain reference based on the tableware identifier value; a send circuit 215a operable to send information; a receiver circuit 217a operable to receive information; a tableware identifier code obtain circuit 219a operable to obtain a tableware identifier code from received block data; a tableware identifier obtain circuit 221a operable to obtain a tableware identifier from the corresponding code; a tableware identifier verification circuit 223a operable to verify the tableware identifier; a food allergen exposure information reference code obtain circuit 225a operable to obtain food allergen exposure information reference (coded) from received block data; a food allergen exposure information reference obtain circuit 227a operable to obtain a food allergen exposure information reference from the corresponding code or the received block data; and a source obtain circuit 229a operable to obtain a source (e.g., network node, database, account, wallet) of the food allergen exposure information based on the food allergen exposure information reference.

In FIG. 2B, the device 200b implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) described herein) may include for instance: a food allergen exposure information reference obtain circuit 201b operable to obtain the food allergen exposure information reference of the tableware; a food allergen exposure information obtain circuit 203b operable to obtain the food allergen exposure information based on the food allergen exposure information reference; a food allergen exposure information database 205b operable to store food allergen exposure information of tableware based on the food allergen exposure information reference; a diner obtain circuit 207b operable to obtain a certain dining position or a certain diner identifier; a diner allergy information obtain circuit 209b operable to obtain food allergy information associated with the certain dining position or the certain diner identifier; a diner allergy information database 211b operable to store food allergy information associated with dining positions or diner identifiers; a tableware assignment determination circuit 213b operable to determine that the tableware can be assigned to the certain dining position or the certain diner identifier based on the food allergen exposure information associated with the tableware and the food allergy information associated with the certain dining position or the certain diner identifier; an input/output interface circuit 215b operable to provide a communication interface to an input device, output device, or input and output device such as a presence sensitive display device 217b (e.g., touchpad display), a sensing device (e.g., camera, QR or bar code scanner, RFID device, NFC device), LED, keypad, payment reader, printer, credit card reader, the like, or any combination thereof; and a tableware assignment circuit 219b operable to assign the tableware to the certain dining position or the certain diner identifier.

In FIG. 2C, the device 200c implements various functional means, units, or modules (e.g., via the processing circuitry 301a in FIG. 3A, via the processing circuitry 501 in FIG. 5, via software code, or the like), or circuits. In one embodiment, these functional means, units, modules, or circuits (e.g., for implementing the method(s) described herein) may include for instance: a diner obtain circuit 201c operable to obtain a certain dining position or a certain diner identifier; a food item obtain circuit 203c operable to obtain a food item associated with the certain dining position or the certain diner identifier; a food ingredients obtain circuit 205c operable to obtain one or more ingredients of a food item; a food ingredients information database 207c operable to store ingredients of food items; a food allergen determination circuit 209c operable to determine food allergen exposure information associated with the food item based on the set of ingredients of the food item; a tableware identifier obtain circuit 211c operable to obtain the tableware identifier of the tableware assigned to the certain dining position or the certain diner identifier; a food allergen exposure information reference obtain circuit 213c operable to obtain the food allergen exposure information reference of the tableware assigned to the certain dining position or the certain diner identifier; a source determination circuit 215c operable to determine a source to update the food allergen exposure information of the tableware based on the food allergen exposure reference of the tableware; and a send circuit 217c operable to send information.

FIG. 2D illustrates one embodiment of a blockchain network node device 200d in accordance with various aspects as described herein. In FIG. 2D, the device 200d implements various functional means, units, or modules (e.g., via the processing circuitry 301b in FIG. 3B, via software code, or the like), or circuits. In one embodiment, these functional means, units, modules, or circuits (e.g., for implementing the method(s) herein) may include for instance: a receiver circuit 201d operable to receive communications; a block data request obtain circuit 203d operable to obtain a block data request and a cryptographic digital asset reference from the received request indication; a block data request validation circuit 205d operable to verify the block data request based on the cryptographic digital asset reference; a block data obtain circuit 207d operable to obtain block data based on the cryptographic digital asset reference; and a send circuit 209d operable to send communications.

FIG. 3A illustrates another embodiment of an electronic device 300a in accordance with various aspects as described herein. In FIG. 3A, the device 300a may include processing circuitry 301a that is operably coupled to memory 303a, a sensing device 305a (e.g., camera, QR or bar code scanner, RFID device, NFC device), a presence sensitive display 307a (e.g., touchscreen), network communications circuitry 309a, the like, or any combination thereof. The sensing device 305a is configured to sense an identifier disposed with tableware. The presence sensitive display 307a is configured to have both an input device (e.g., touch panel) and an output device (e.g., display panel). The network communication circuitry 309a is configured to transmit and/or receive information to and/or from one or more other network node devices via any communication technology. The processing circuitry 301a is configured to perform processing described herein, such as by executing instructions stored in memory 303a. The processing circuitry 301a in this regard may implement certain functional means, units, or modules.

FIG. 3B illustrates another embodiment of a network node device 300b in accordance with various aspects as described herein. In FIG. 3B, the device 300b may include processing circuitry 301b that is operably coupled to memory 303b, network communications circuitry 305b, the like, or any combination thereof. The network communication circuitry 305b is configured to transmit and/or receive information to and/or from one or more other network node devices via any communication technology. The processing circuitry 301b is configured to perform processing described herein, such as by executing instructions stored in memory 303b. The processing circuitry 301b in this regard may implement certain functional means, units, or modules.

FIGS. 4A-4E illustrate embodiments of a method 400a-e of tracking tableware utilization in accordance with various aspects as described herein. In FIG. 4A, the method 400a performed by an electronic device may start at block 401a where it may include outputting, by an electronic device, for display on a presence sensitive display of the electronic device, a visual representation associated with a set of dining positions of a certain dining surface or a certain diner identifier. At block 403a, the method 400a may include receiving, from the presence sensitive display, an indication of a touch gesture detected at or about the visual representation of one of the set of dining positions or the certain diner identifier. At block 405a, the method 400a may include determining that the touch gesture corresponds to a certain dining position of the set of dining positions or the certain diner identifier. At block 407a, the method 400a may include outputting, for display on the presence sensitive display, a visual representation associated with one or more food allergies that can be associated with the certain dining position or the certain diner identifier. At block 409a, the method 400a may include receiving, from the presence sensitive display, an indication of a touch gesture detected at or about the one or more food allergies. At block 411a, the method 400a may include determining that the touch gesture corresponds to the one or more food allergies. At block 413a, the method 400a may include associating the one or more food allergies to the certain dining position or the certain diner identifier. At block 415a, the method 400a includes determining to assign the tableware to the certain dining position or the certain diner identifier based on food allergen exposure information of the assigned tableware and the one or more food allergens associated with the certain dining position or the certain diner identifier.

In FIG. 4B, the method 400b performed by an electronic device may start at block 401b where it may include outputting, by the electronic device, for display on the presence sensitive display, a visual representation associated with a request to position tableware about the electronic device so that the sensing device can sense the identifier specific to that tableware. In response, the method 400b may include receiving, from the sensing device, an indication associated with the unique identifier specific to the tableware, as represented by block 403b. At block 405b, the method 400b may include obtaining the blockchain reference to the cryptographic digital asset stored in the blockchain based on the tableware identifier. At block 407b, the method 400b may include sending, to a blockchain network node, an indication that includes a request for block data associated with the cryptographic digital asset and the included cryptographic digital asset reference. In response, the method 400b includes receiving, from the blockchain network node, the block data associated with the cryptographic digital asset, with the block data having the tableware identifier code and the food allergen exposure information reference (coded or uncoded), as represented by block 409b. At block 411b, the method 400b may include obtaining the tableware identifier code based on the received block data. At block 413b, the method 400b may include verifying the tableware identifier code based on a public key or a private key associated with the tableware identifier code. At block 415b, the method 400b may include obtaining the food allergen exposure information reference based on the received block data. At block 417b, the method 400b may include obtaining the food allergen exposure information reference based on a public key or a private key associated with the corresponding reference.

In FIG. 4C, the method 400c performed by an electronic device may start, for instance, at block 401c where it may include obtaining the food allergen exposure information reference of the tableware. At block 403c, the method 400c may include obtaining the food allergen exposure information based on the food allergen exposure information reference. At block 405c, the method 400c may include obtaining a certain dining position or a certain diner identifier. At block 407c, the method 400c may include obtaining food allergy information associated with the certain dining position or the certain diner identifier. At block 409c, the method 400c includes determining that the tableware can be assigned to the certain dining position or the certain diner identifier based on the food allergen exposure information of the tableware and the food allergy information associated with the certain dining position or the certain diner identifier. In response, the method 400c may include outputting, for display on the presence sensitive display, a visual representation that indicates that the tableware can be assigned to the certain dining position or the certain diner identifier associated with the food allergy, as represented by block 411c. Further, the method 400c may include outputting, for display on the presence sensitive display, a visual representation associated with a selection to assign the tableware to the certain dining position or the certain diner identifier, as represented by block 413c. In response, the method 400c may include receiving, from the presence sensitive display, an indication of a touch gesture detected at or about the tableware assign selection, as represented by block 415c. At block 417c, the method 400c may include determining to assign the tableware to the certain dining position or the certain diner identifier based on the touch gesture indication. At block 419b, the method 400c may include assigning the tableware to the certain dining position or the certain diner identifier.

In FIB. 4D, the method 400d performed by an electronic device may start, for instance, at block 401d where it may include obtaining a certain dining position or a certain diner identifier. At block 403d, the method 400d may include obtaining a food item associated with the certain dining position or the certain diner identifier. At block 405d, the method 400d may include obtaining one or more ingredients or allergens of the food item. At block 407d, the method 400d may include determining food allergen information associated with the food item based on the one or more ingredients or allergens of the food item. At block 409d, the method 400d may include obtaining the tableware identifier of the tableware assigned to the certain dining position or the certain diner identifier. At block 411d, the method 400d may include obtaining the food allergen exposure information reference of the tableware assigned to the certain dining position or the certain diner identifier. At block 413d, the method 400d may include determining a source to update the food allergen information of the tableware assigned to the certain dining position or the certain diner identifier based on the food allergen exposure information reference of the tableware. At block 415d, the method 400d includes sending, to the source, an indication that includes the food allergen information of the food item and the food allergen exposure information reference of the tableware.

In FIG. 4E, the method 400e performed by a blockchain network node may start, for instance, at block 401e where it may include receiving, from the electronic device, an indication that includes a request for block data associated with the cryptographic digital asset, with the request indication having the cryptographic digital asset reference. At block 403e, the method 400e may include obtaining the block data request and the corresponding blockchain reference from the request indication. At block 405e, the method 400e may include validating the block data request based on the cryptographic digital asset reference. At block 407e, the method 400e may include obtaining the block data associated with the cryptographic digital asset based on the cryptographic digital asset reference. At block 409e, the method 400e includes sending, to the electronic device, an indication that includes the requested block data associated with the cryptographic digital asset based on the tableware identifier sensed from the tableware.

Figure 5:
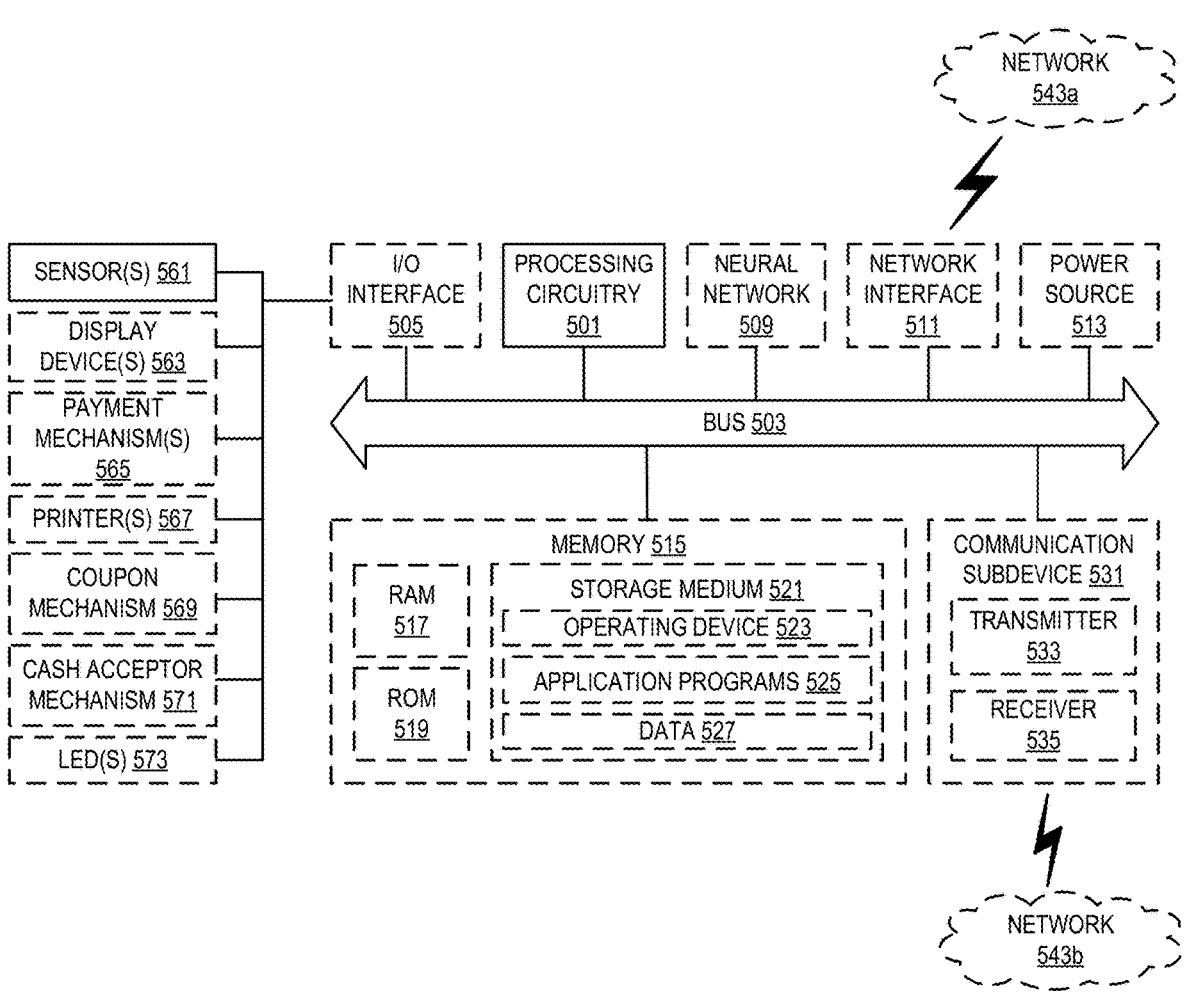
FIG. 5 illustrates another embodiment of an electronic device in accordance with various aspects as described herein.

FIG. 5 illustrates another embodiment of an electronic device 500 in accordance with various aspects as described herein. In FIG. 5, device 500 includes processing circuitry 501 that is operatively coupled to input/output interface 505, neural network circuit 509, network connection interface 511, power source 513, memory 515 including random access memory (RAM) 517, read only memory (ROM) 519 and storage medium 521, communication subsystem 531, and/or any other component, or any combination thereof.

The input/output interface 505 may be configured to provide a communication interface to an input device, an output device, or an input and output device. The device 500 may be configured to use an output device via input/output interface 505. An output device may use the same type of interface port as an input device. For example, a USB port, a Bluetooth port, a near field communication (NFC) port, or the like may be used to provide input to and output from the device 500. The output device may be a speaker, a sound card, a video card, a display, a monitor, a printer, an actuator, an emitter, a smartcard, another output device, or any combination thereof. The device 500 may be configured to use an input device via input/output interface 505 to allow a user to capture information into the device 500. The input device may include a touch-sensitive or presence-sensitive display, an optical sensor, (e.g., a digital camera, a digital video camera, a web camera, a scanner, etc.), a scanner, a weight scale, a microphone, a sensor, a mouse, a trackball, a directional pad, a trackpad, a scroll wheel, a smartcard, and the like. In one example, the input device may be a combined scale and scanner. The scale can be operable to weigh one or more items placed on a transparent window associated with the combined scale and scanner. The scanner can be operable to scan an identifier (e.g., barcode, Q/R code, RF ID) disposed with a scanned item. The presence-sensitive display may include a capacitive or resistive touch sensor to sense input from a user. As shown in FIG. 5, the input/output interface 505 can be configured to provide a communication interface to various input/output components such as a scanners or sensors 561, a display device 563, a payment processing mechanism 565, a printer 567, a coupon slot mechanism 569, a cash acceptor mechanism 571, a light emitting device 573, the like, or any combination thereof. A sensor may be, for instance, an accelerometer, a gyroscope, an RFID detector device, an NFC detector device, a tilt sensor, a force sensor, a magnetometer, an optical or image sensor, an infrared sensor, a proximity sensor, another like sensor, or any combination thereof.

In FIG. 5, storage medium 521 may include operating system 523, application program 525, data 527, resolution data 529, the like, or any combination thereof. In other embodiments, storage medium 521 may include other similar types of information. Certain devices may utilize all of the components shown in FIG. 5, or only a subset of the components. The level of integration between the components may vary from one device to another device. Further, certain devices may contain multiple instances of a component, such as multiple processors, memories, neural networks, network connection interfaces, transceivers, etc.

In FIG. 5, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In FIG. 5, the neural network circuit 509 may be configured to learn to perform tasks by considering examples such as performing object detection, classification or identification of certain objects in an image. In FIG. 5, the network connection interface 511 may be configured to provide a communication interface to network 543a. The network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. The network connection interface 511 may be configured to include a receiver and a transmitter interface used to communicate with one or more other devices over a communication network according to one or more communication protocols, such as Ethernet, TCP/IP, SONET, ATM, or the like. The network connection interface 511 may implement receiver and transmitter functionality appropriate to the communication network links (e.g., optical, electrical, and the like). The transmitter and receiver functions may share circuit components, software or firmware, or alternatively may be implemented separately.

The RAM 517 may be configured to interface via a bus 503 to the processing circuitry 501 to provide storage or caching of data or computer instructions during the execution of software programs such as the operating system, application programs, and device drivers. The ROM 519 may be configured to provide computer instructions or data to processing circuitry 501. For example, the ROM 519 may be configured to store invariant low-level system code or data for basic system functions such as basic input and output (I/O), startup, or reception of keystrokes from a keyboard that are stored in a non-volatile memory. The storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, the storage medium 521 may be configured to include an operating system 523, an application program 525 such as web browser, user interface, user interface, browser data manager as described herein, a widget or gadget engine, or another application, and a data file 527. The storage medium 521 may store, for use by the device 500, any of a variety of various operating systems or combinations of operating systems.

The storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. The storage medium 521 may allow the device 500a-b to access computer-executable instructions, application programs or the like, stored on transitory or non-transitory memory media, to off-load data, or to upload data. An article of manufacture, such as one utilizing a communication system may be tangibly embodied in the storage medium 521, which may comprise a device readable medium.

The processing circuitry 501 may be configured to communicate with network 543b using the communication subsystem 531. The network 543a and the network 543b may be the same network or networks or different network or networks. The communication subsystem 531 may be configured to include one or more transceivers used to communicate with the network 543b. For example, the communication subsystem 531 may be configured to include one or more transceivers used to communicate with one or more remote transceivers of another device capable of wireless communication according to one or more communication protocols, such as IEEE 802.11, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software, or firmware, or alternatively may be implemented separately.

In FIG. 5, the communication functions of the communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, the communication subsystem 531 may include cellular communication, Wi-Fi communication, Bluetooth communication, and GPS communication. The network 543b may encompass wired and/or wireless networks such as a local-area network (LAN), a wide-area network (WAN), a computer network, a wireless network, a telecommunications network, another like network or any combination thereof. For example, the network 543b may be a cellular network, a Wi-Fi network, and/or a near-field network. The power source 513 may be configured to provide alternating current (AC) or direct current (DC) power to components of the device 500a-b.

The features, benefits and/or functions described herein may be implemented in one of the components of the device 500 or partitioned across multiple components of the device 500. Further, the features, benefits, and/or functions described herein may be implemented in any combination of hardware, software, or firmware. In one example, communication subsystem 531 may be configured to include any of the components described herein. Further, the processing circuitry 501 may be configured to communicate with any of such components over the bus 503. In another example, any of such components may be represented by program instructions stored in memory that when executed by the processing circuitry 501 perform the corresponding functions described herein. In another example, the functionality of any of such components may be partitioned between the processing circuitry 501 and the communication subsystem 531. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts for illustrative purposes, but the embodiments are similarly applicable in other contexts not explicitly described.

In one exemplary embodiment, a method is performed by an electronic device having a sensing device operable to sense an identifier specific to and disposed with tableware. Further, the electronic device is communicatively coupled over a network to a blockchain network that includes network nodes that are collectively configured to operate a blockchain having blocks. Each block has a header and a body with one or more transaction entries. The header has a reference to a previous block on the blockchain and a reference to the transaction entries of the current block on the blockchain. The tableware identifier is specific to a cryptographic digital asset stored on the blockchain as a code that represents the tableware identifier. Also, the cryptographic digital asset includes a reference to information associated with the tableware being exposed to a food allergen. The tableware identifier code and the food allergen exposure information reference is included in a transaction entry of a block on the blockchain that is associated with the cryptographic digital asset. The method includes sending, to a network node of the blockchain network over the network, an indication that includes a request for block data associated with the cryptographic digital asset based on the tableware identifier sensed from the tableware so that the food allergen exposure information of the tableware can be obtained based on the allergen exposure reference.

In another exemplary embodiment, the method further includes receiving, from the blockchain network node over the network, the block data associated with the cryptographic digital asset responsive to the sending of the block data request indication.

In another exemplary embodiment, the method further includes obtaining the food allergen exposure information reference based on the received block data.

In another exemplary embodiment, the method further includes obtaining the food allergen exposure information reference based on a public key or a private key associated with the food allergen exposure information reference code, wherein the block data includes the food allergen exposure information reference code.

In another exemplary embodiment, the method further includes obtaining a food item associated with the tableware, obtaining food allergen information associated with the food item, obtaining the food allergen exposure information reference of the tableware, and sending, by the electronic device, to a network node associated with the food allergen exposure information reference, an indication that includes the food allergen information of the food item and the food allergen exposure information reference of the tableware so that the food allergen exposure information of the tableware can be updated to include the food allergen information of the food item.

In another exemplary embodiment, the method further includes obtaining a set of ingredients of the food item. Further, the food allergen information obtaining step is based on the set of ingredients of the food item.

In another exemplary embodiment, the method further includes obtaining the food allergen exposure information reference of the tableware, obtaining the food allergen exposure information based on the corresponding reference, obtaining food allergy information specific to an individual, determining that the tableware can be assigned to the individual based on the food allergen exposure information of the tableware and the food allergy information of the individual, and assigning the tableware to the individual.

In another exemplary embodiment, the food allergen exposure information obtaining step includes sending, by the electronic device, to a network node associated with the food allergen exposure information reference, an indication that includes a request for the food allergen exposure information of the tableware and the food allergen exposure information reference. The method further includes receiving, by the electronic device, from the network node, an indication that includes the food allergen exposure information of the tableware.

In another exemplary embodiment, the tableware identifier code includes a cryptographic token and a public key. Further, a private key associated with the tableware identifier code is issued to a digital wallet account associated with the cryptographic digital asset.

In another exemplary embodiment, the food allergen exposure information reference code includes a cryptographic token and a public key. Further, a private key associated with the food allergen exposure information reference code is issued to a digital wallet account associated with the cryptographic digital asset.

In another exemplary embodiment, the food allergen exposure information reference includes a uniform resource locator (URL) directed to a network node that is configured to have access to the food allergen exposure information of the tableware.

In another exemplary embodiment, the food allergen exposure information reference includes a reference to a database having the food allergen exposure information of the tableware.

In another exemplary embodiment, the food allergen exposure information reference includes a reference to a transaction entry of a block on the blockchain that includes the food allergen exposure information of the tableware.

In one exemplary embodiment, an electronic device includes a sensing device operable to sense an identifier specific to and disposed with tableware. Further, the electronic device is communicatively coupled over a network to a blockchain network that includes network nodes that are collectively configured to operate a blockchain having blocks. Each block has a header and a body with one or more transaction entries. Further, the header has a reference to a previous block on the blockchain and a reference to the transaction entries of the current block on the blockchain. The tableware identifier is specific to a cryptographic digital asset stored on the blockchain as a code that represents the tableware identifier. The cryptographic digital asset also includes a reference to information associated with the tableware being exposed to a food allergen. The tableware identifier code and the food allergen exposure information reference is included in a transaction entry of a block on the blockchain that is associated with the cryptographic digital asset. The electronic device further includes processing circuitry and a memory, with the memory containing instructions executable by the processing circuitry whereby the processing circuitry is configured to send, to a network node of the blockchain network over the network, an indication that includes a request for block data associated with the cryptographic digital asset based on the tableware identifier sensed from the tableware so that the food allergen exposure information of the tableware can be obtained based on the allergen exposure reference.

In another exemplary embodiment, the memory includes further instructions executable by the processing circuitry whereby the processing circuitry is configured to receive, from the blockchain network node over the network, the block data associated with the cryptographic digital asset responsive to the sending of the block data request indication and obtain the food allergen exposure information reference based on the received block data.

In another exemplary embodiment, the memory includes further instructions executable by the processing circuitry whereby the processing circuitry is configured to obtain the food allergen exposure information reference based on a public key or a private key associated with the food allergen exposure information reference code. Further, the block data includes the food allergen exposure information reference code.

In another exemplary embodiment, the memory includes further instructions executable by the processing circuitry whereby the processing circuitry is configured to obtain a food item associated with the tableware, obtain food allergen information associated with the food item, obtain the food allergen exposure information reference of the tableware, or send, to a network node associated with the food allergen exposure information reference, an indication that includes the food allergen information of the food item and the food allergen exposure information reference of the tableware so that the food allergen exposure information of the tableware can be updated to include the food allergen information of the food item.

In another exemplary embodiment, the memory includes further instructions executable by the processing circuitry whereby the processing circuitry is configured to obtain a set of ingredients of the food item. Further, the food allergen information obtaining step is based on the set of ingredients of the food item.

In another exemplary embodiment, the memory includes further instructions executable by the processing circuitry whereby the processing circuitry is configured to obtain the food allergen exposure information reference of the tableware, obtain the food allergen exposure information based on the food allergen exposure information reference, obtain food allergy information specific to an individual, determine that the tableware can be assigned to the individual based on the food allergen exposure information of the tableware and the food allergy information of the individual, or assign the tableware to the individual.

In another exemplary embodiment, the memory includes further instructions executable by the processing circuitry whereby the processing circuitry is configured to send, to a network node associated with the food allergen exposure information reference, an indication that includes a request for the food allergen exposure information of the tableware and the food allergen exposure information reference or receive, from the network node, an indication that includes the food allergen exposure information of the tableware.

The previous detailed description is merely illustrative in nature and is not intended to limit the present disclosure, or the application and uses of the present disclosure. Furthermore, there is no intention to be bound by any expressed or implied theory presented in the preceding field of use, background, summary, or detailed description. The present disclosure provides various examples, embodiments and the like, which may be described herein in terms of functional or logical block elements. The various aspects described herein are presented as methods, devices (or apparatus), systems, or articles of manufacture that may include a number of components, elements, members, modules, nodes, peripherals, or the like. Further, these methods, devices, systems, or articles of manufacture may include or not include additional components, elements, members, modules, nodes, peripherals, or the like.

Furthermore, the various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (email) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A method of maintaining a historical record of food allergen exposure to tableware, comprising:

by an electronic device having a processing circuitry operatively coupled to a network interface circuitry operable to communicate over a network and a sensing device operable to sense an identifier specific to and disposed with tableware, the electronic device being communicatively coupled via the network interface circuitry over the network to a blockchain network that includes network nodes that are collectively configured to operate a blockchain having blocks, with each block having a header and a body with one or more transaction entries, with the header having a reference to a previous block on the blockchain and a reference to the transaction entries of the current block on the blockchain, the tableware identifier being specific to a cryptographic digital asset stored on the blockchain as a code that represents the tableware identifier, the cryptographic digital asset also includes a reference to information that represents a historical record of any food allergen exposure to the tableware, with the tableware identifier code and the food allergen exposure information reference being included in a transaction entry of a block on the blockchain that is associated with the cryptographic digital asset, sending, via the network interface circuitry, to a network node of the blockchain network over the network, an indication that includes a request for block data associated with the cryptographic digital asset based on the tableware identifier disposed on the tableware that is sensed by the sensing device;

receiving, via the network interface circuitry, from the network node of the blockchain network over the network, an indication that includes the block data having the tableware identifier code and the food allergen exposure information reference;

decrypting, by the processing circuitry, the food allergen exposure information reference based on a public or private key associated with the electronic device to obtain the food allergen exposure information;

comparing, by the processing circuitry, the obtained food allergen exposure information to obtained food allergy information associated with a diner identifier;

determining, by the processing circuitry, based on the comparison, that the tableware is compatible with the diner identifier; and sending, via the network interface circuitry, to the network node of the blockchain network over the network, an indication that includes a request to register a new transaction on the blockchain that includes the tableware identifier and the food allergen exposure information reference; and causing, in response to the register request, the network node of the blockchain network to add a transaction entry to the blockchain that updates the historical record of food allergen exposure associated with the tableware.

2. The method of claim 1, further comprising:

receiving, from the network node of the blockchain network over the network, the block data associated with the cryptographic digital asset responsive to the sending of the block data request indication.

3. The method of claim 1, further comprising:

obtaining the food allergen exposure information reference based on the received block data.

4. The method of claim 3, further comprising:

obtaining the food allergen exposure information reference based on a public key or a private key associated with a food allergen exposure information reference code, wherein the block data includes the food allergen exposure information reference code.

5. The method of claim 1, further comprising:

obtaining a food item associated with the tableware;

obtaining food allergen information associated with the food item;

obtaining the food allergen exposure information reference of the tableware;

sending, by the electronic device, to a network node associated with the food allergen exposure information reference, an indication that includes the food allergen information of the food item and the food allergen exposure information reference of the tableware so that the food allergen exposure information of the tableware can be updated to include the food allergen information of the food item.

6. The method of claim 5, further comprising:

obtaining a set of ingredients of the food item; and wherein the food allergen information obtaining step is based on the set of ingredients of the food item.

7. The method of claim 1, further comprising:

obtaining the food allergen exposure information reference of the tableware;

obtaining the food allergen exposure information based on the food allergen exposure information reference;

obtaining food allergy information specific to a certain diner identifier;

determining that the tableware can be assigned to the certain diner identifier based on the food allergen exposure information of the tableware and the food allergy information associated with the certain diner identifier; and assigning the tableware to the certain diner identifier.

8. The method of claim 7, wherein the food allergen exposure information obtaining step includes:

sending, by the electronic device, to a network node associated with the food allergen exposure information reference, an indication that includes a request for the food allergen exposure information of the tableware and the food allergen exposure information reference; and receiving, by the electronic device, from the network node, an indication that includes the food allergen exposure information of the tableware.

9. The method of claim 1, wherein the tableware identifier code includes a cryptographic token and a public key, with a private key associated with the tableware identifier code being issued to a digital wallet account associated with the cryptographic digital asset.

10. The method of claim 1, wherein the food allergen exposure information reference is represented by a food allergen exposure information code having a cryptographic token and a public key, with a private key associated with the food allergen exposure information reference code being issued to a digital wallet account associated with the cryptographic digital asset.

11. The method of claim 1, wherein the food allergen exposure information reference includes a uniform resource locator (URL) to a network node that is configured to have access to the food allergen exposure information of the tableware.

12. The method of claim 1, wherein the food allergen exposure information reference includes a reference to a database having the food allergen exposure information of the tableware.

13. The method of claim 1, wherein the food allergen exposure information reference includes a reference to a transaction entry of a block on the blockchain that includes the food allergen exposure information of the tableware.

14. An electronic device operable to maintain a historical record of food allergen exposure to tableware, comprising:

a network interface circuitry operable to communicate over a network and a sensing device operable to sense an identifier specific to and disposed with tableware, the electronic device being communicatively coupled via the network interface circuitry over the network to a blockchain network that includes network nodes that are collectively configured to operate a blockchain having blocks, with each block having a header and a body with one or more transaction entries, with the header having a reference to a previous block on the blockchain and a reference to the transaction entries of the current block on the blockchain, the tableware identifier being specific to a cryptographic digital asset stored on the blockchain as a code that represents the tableware identifier, the cryptographic digital asset also includes a reference to information that represents a historical record of any food allergen exposure to the tableware, with the tableware identifier code and the food allergen exposure information reference being included in a transaction entry of a block on the blockchain that is associated with the cryptographic digital asset; and wherein the electronic device further comprises processing circuitry and a memory, the memory containing instructions executable by the processing circuitry whereby the processing circuitry is configured to:

send, via the network interface circuitry, to a network node of the blockchain network over the network, an indication that includes a request for block data associated with the cryptographic digital asset based on the tableware identifier disposed on the tableware that is sensed by the sensing device;

receive, via the network interface circuitry, from the network node of the blockchain network over the network, an indication that includes the block data having the tableware identifier code and the food allergen exposure information reference;

decrypt the food allergen exposure information reference based on a public or private key associated with the electronic device to obtain the food allergen exposure information;

compare the obtained food allergen exposure information to obtained food allergy information associated with a diner identifier;

determine, based on the comparison, that the tableware is compatible with the diner identifier;

send, via the network interface circuitry, to the network node of the blockchain network over the network, an indication that includes a request to register a new transaction on the blockchain that includes the tableware identifier and the food allergen exposure information reference; and cause, in response to the register request, the network node of the blockchain network to add a transaction entry to the blockchain that updates the historical record of food allergen exposure associated with the tableware.

15. The device of claim 14, wherein the memory includes further instructions executable by the processing circuitry whereby the processing circuitry is configured to:

receive, from the network node of the blockchain network over the network, the block data associated with the cryptographic digital asset responsive to the sending of the block data request indication; and obtain the food allergen exposure information reference based on the received block data.

16. The device of claim 14, wherein the memory includes further instructions executable by the processing circuitry whereby the processing circuitry is configured to:

obtain the food allergen exposure information reference based on a public key or a private key associated with a food allergen exposure information reference code, wherein the block data includes the food allergen exposure information reference code.

17. The device of claim 14, wherein the memory includes further instructions executable by the processing circuitry whereby the processing circuitry is configured to:

obtain a food item associated with the tableware;

obtain food allergen information associated with the food item;

obtain the food allergen exposure information reference of the tableware; and send, to a network node associated with the food allergen exposure information reference, an indication that includes the food allergen information of the food item and the food allergen exposure information reference of the tableware so that the food allergen exposure information of the tableware can be updated to include the food allergen information of the food item.

18. The device of claim 14, wherein the memory includes further instructions executable by the processing circuitry whereby the processing circuitry is configured to:

obtain a food item associated with a certain diner identifier for which the tableware has been assigned;

obtaining a set of ingredients of the food item;

obtain food allergen information based on the set of ingredients of the food item;

obtain the food allergen exposure information reference of the tableware; and send, to a network node associated with the food allergen exposure information reference, an indication that includes the food allergen information of the food item and the food allergen exposure information reference of the tableware so that the food allergen exposure information of the tableware can be updated to include the food allergen information of the food item.

19. The device of claim 14, wherein the memory includes further instructions executable by the processing circuitry whereby the processing circuitry is configured to:

obtain the food allergen exposure information reference of the tableware;

obtain the food allergen exposure information based on the food allergen exposure information reference;

obtain food allergy information specific to a certain diner identifier;

determine that the tableware can be assigned to the certain diner identifier based on the food allergen exposure information of the tableware and the food allergy information of the certain diner identifier; and assign the tableware to the certain diner identifier.

20. The device of claim 14, wherein the memory includes further instructions executable by the processing circuitry whereby the processing circuitry is configured to:

send, to a network node associated with the food allergen exposure information reference, an indication that includes a request for the food allergen exposure information of the tableware and the food allergen exposure information reference; and receive, from the network node, an indication that includes the food allergen exposure information of the tableware.

* * * * *